(12) United States Patent
Yoon

(10) Patent No.: US 9,657,875 B2
(45) Date of Patent: May 23, 2017

(54) BACK FERRULE HAVING BELLOWS-SHAPED ELASTIC PART

(71) Applicant: BMT CO., LTD., Yangsan-si, Gyeongsangnam-do (KR)

(72) Inventor: Jong-Chan Yoon, Busan (KR)

(73) Assignee: BMT CO., LTD., Yangsan-si, Gyeongsangnam-do (KR)

( * ) Notice: Subject to any disclaimer, the term of this patent is extended or adjusted under 35 U.S.C. 154(b) by 0 days.

(21) Appl. No.: 14/441,635

(22) PCT Filed: Aug. 7, 2013

(86) PCT No.: PCT/KR2013/007121
§ 371 (c)(1),
(2) Date: May 8, 2015

(87) PCT Pub. No.: WO2014/073775
PCT Pub. Date: May 15, 2014

(65) Prior Publication Data
US 2015/0276102 A1    Oct. 1, 2015

(30) Foreign Application Priority Data

Nov. 8, 2012  (KR) .................. 10-2012-0125968

(51) Int. Cl.
*F16L 19/06*    (2006.01)
*F16L 19/10*    (2006.01)
(Continued)

(52) U.S. Cl.
CPC .......... *F16L 19/061* (2013.01); *F16L 19/041* (2013.01); *F16L 19/065* (2013.01); *F16L 19/07* (2013.01); *F16L 19/103* (2013.01)

(58) Field of Classification Search
USPC ................. 285/339, 341, 342, 343, 382.7
See application file for complete search history.

(56) References Cited

U.S. PATENT DOCUMENTS 591,828 A * 10/1897 Duncan ................. F16L 25/065
  285/339
2,381,554 A *  8/1945 Norgren ............... F16L 33/207
  285/114
(Continued)

FOREIGN PATENT DOCUMENTS

EP    2 128 509       12/2009
KR  10-2006-0029325    4/2006
(Continued)

OTHER PUBLICATIONS

Written Opinion of the International Searching Authority with English translation, for International Application No. PCT/KR2013/007121, dated Dec. 2, 2013.
(Continued)

*Primary Examiner* — Aaron Dunwoody
(74) *Attorney, Agent, or Firm* — Kile Park Reed & Houtteman PLLC

(57) ABSTRACT

Disclosed herein is a back ferrule having a bellows-shaped elastic part. The back ferrule (40) is used, for pipe connection, along with: a connector body (10) having an external thread on an outer circumferential surface thereof; a drive nut (20) having an internal thread on an inner circumferential surface thereof; and a front ferrule (30). The back ferrule (40) includes: a nose part (41) having a front-end inclined surface (41b); a tail part (42) having a rear-end inclined surface (42b); and an outer circumferential surface (43) and an inner circumferential surface (44) connecting the nose part to the tail part. An outer circumferential corrugated surface (45) and an inner circumferential corrugated surface (46) are respectively formed on the outer circumferential surface and the inner circumferential surface between the nose part and the tail part.

1 Claim, 3 Drawing Sheets

(51) Int. Cl.
*F16L 19/065* (2006.01)
*F16L 19/04* (2006.01)
*F16L 19/07* (2006.01)

(56) References Cited

U.S. PATENT DOCUMENTS

| | | | | |
|---|---|---|---|---|
| 3,498,646 | A * | 3/1970 | Depuy | F16L 19/12 |
| | | | | 285/339 |
| 3,719,375 | A * | 3/1973 | Nordin | F16L 19/063 |
| | | | | 285/339 |
| 5,882,050 | A * | 3/1999 | Williams | F16L 19/10 |
| | | | | 285/343 |
| 7,900,976 | B2 * | 3/2011 | Kainec | F16L 13/146 |
| | | | | 285/343 |
| 2009/0066082 | A1 | 3/2009 | Kainec | |
| 2010/0140932 | A1 | 6/2010 | Williams et al. | |
| 2015/0137517 | A1 * | 5/2015 | Inoue | F16L 19/065 |
| | | | | 285/382.7 |

FOREIGN PATENT DOCUMENTS

| | | |
|---|---|---|
| KR | 10-0803685 | 2/2008 |
| KR | 10-0803687 | 2/2008 |
| KR | 10-0871624 | 12/2008 |
| KR | 10-0871625 | 12/2008 |
| KR | 10-0914946 | 8/2009 |
| KR | 10-0987333 | 10/2010 |
| KR | 10-0987334 | 10/2010 |
| KR | 10-1196433 | 11/2012 |

OTHER PUBLICATIONS

International Search Report for International Application No. PCT/KR2013/007121, dated Dec. 2, 2013.

* cited by examiner

BACK FERRULE HAVING BELLOWS-SHAPED ELASTIC PART

TECHNICAL FIELD

The present invention generally relates to devices used to connect metal pipes or tubes. More particularly, the present invention relates to a back ferrule that has a bellows-shaped elastic part, is operated along with a front ferrule as one unit, is able to increase force for clamping or fastening a pipe and improve the sealability between the pipe and a pipe connector, and has superior flexibility and adaptability to cope with contraction or expansion of a connection part of the pipe depending on a change in the external environment.

BACKGROUND ART

Generally, front ferrules and back ferrules are used in the connection of pipes or tubes. FIG. 5 is a sectional view showing a pipe connector using conventional ferrules.

As shown in the drawing, the pipe connector using the ferrules includes a connector body 1, a drive nut 4, and a front ferrule 2 and a back ferrule 3 that are interposed between the connector body 1 and the drive nut 4. The pipe connector compresses and clamps the outer circumferential surface of a pipe 5.

In detail, when the drive nut 4 is threaded over the connector body 1 and thus moved forward, the front ferrule 2 and the back ferrule 3 that are disposed between the inner circumferential surface of the drive nut 4 and the outer circumferential surface of the pipe 5 are pushed and moved forward. During this process, front ends of the front and back ferrules 2 and 3 are changed in shape and embedded into the outer circumferential surface of the pipe 5 so that the pipe connection can become more reliable.

Different kinds of pipe connectors or tube fitting structures using such ferrules and ferrule structures have been introduced. Representative examples have been proposed in Korean Patent Registration No. 10-0871624, entitled "Ferrule having relief part for reducing abrasion", Korean Patent Registration No. 10-0803687, entitled "Ferrule having relief part for reducing abrasion", Korean Patent Registration No. 10-0803685, entitled "Ferrule having relief part for reducing abrasion", Korean Patent Registration No. 10-0871625, entitled "Ferrule having relief part for reducing abrasion", Korean Patent Registration No. 10-0914946, entitled "Ferrule having relief part for reducing abrasion", Korean Patent Registration No. 10-0987333, entitled "Tube fitting structure", Korean Patent Registration No. 10-0987334, entitled "Tube fitting structure capable of checking degree of tightening", and Korean Patent Registration No. 10-1196433, entitled "Tube fitting structure".

In Korean Patent Registration Nos. 10-0871624, 10-0803687, 10-0803685, 10-0871625 and 10-0914946, at least one concave part is formed in the inner circumferential surface of the back ferrule so that partial load, abrasion or torque applied to the pipe and the pipe connector by the drive nut can be markedly reduced or removed.

The above-mentioned registered patents are characterized and advantageous in that some of the external axial force applied to the back ferrule is dispersed in the radial direction, whereby the ferrule and the pipe can be prevented from being undesirably deformed.

However, in the above-mentioned registered patents, after the ferrules have been changed in shape to clamp the pipe, it is difficult for the ferrules to appropriately cope with a change in external environment such as temperature, pressure or external force applied thereto. Specially, the conventional ferrules do not have any compensation function for thermal expansion or contraction of the pipe made of metal, the connector body, the drive nut or the ferrules themselves.

DISCLOSURE

Technical Problem

Accordingly, the present invention has been made keeping in mind the above problems occurring in the prior art, and an object of the present invention is to provide a back ferrule for use in connection of a pipe that can increase the force for clamping the pipe and improve the sealability between the pipe and a pipe connector, and which has a superior shock absorption or compensation function for coping with contraction or expansion of a connection part of the pipe depending on a change in the external environment such as temperature or pressure or a change in external force.

Another object of the present invention is to provide a pipe connector with the back ferrule having the above-mentioned advantages.

Technical Solution

In order to accomplish the above objects, in an aspect, the present invention provides a back ferrule having a bellows-shaped elastic part. The back ferrule is used for pipe connection along with: a connector body mounted on an outer circumferential surface of a pipe, with an external thread formed on an outer circumferential surface of the connector body; a drive nut having an internal thread on an inner circumferential surface thereof; and a front ferrule. The back ferrule includes a nose part having a front-end inclined surface; a tail part having a rear-end inclined surface; and an outer circumferential surface and an inner circumferential surface that connect the nose part to the tail part. An outer circumferential corrugated surface and an inner circumferential corrugated surface are respectively formed on the outer circumferential surface and the inner circumferential surface between the nose part and the tail part.

Each of the outer circumferential corrugated surface and the inner circumferential corrugated surface may include a valley and a ridge.

In another aspect, the present invention provides a pipe connector including a back ferrule. The back ferrule includes: a connector body that has an external thread on an outer circumferential surface thereof and is provided with an inclined insert part on one end thereof; a drive nut that is threaded over the connector body, and which has an internal thread on an inner circumferential surface thereof and is provided with a rear compressing part on one end thereof; a front ferrule disposed inside the inner circumferential surface of the drive nut; and a back ferrule that is disposed between the front ferrule and the back ferrule and has a bellows-shaped elastic part.

Advantageous Effects

A back ferrule according to the present invention has a bellows-shaped elastic part formed between a nose part and a tail part. The bellows-shaped elastic part can increase the force of clamping a pipe to be connected to a pipe connector and improve the sealability between the pipe and the pipe connector.

Furthermore, thanks to the elastic and bending characteristics of the bellows-shaped elastic part, the back ferrule can be improved in a shock absorption or compensation function for coping with a change in the external environment such as temperature or pressure or a change in external force.

BEST MODE

Figure 1:
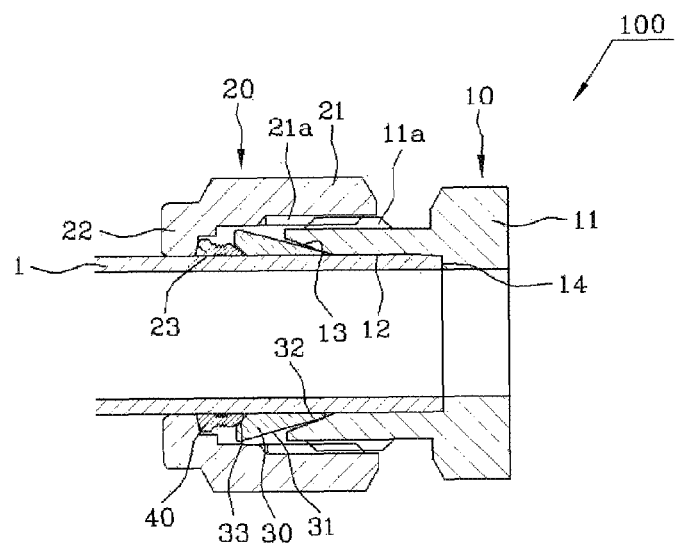
FIG. 1 is a sectional view illustrating a pipe connector including a back ferrule according to the present invention.
Figure 2:
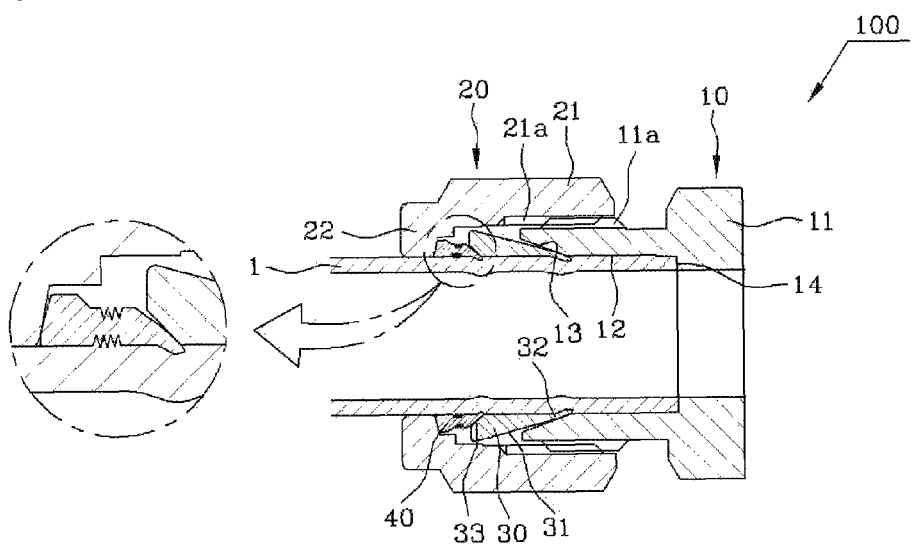
FIG. 2 is a sectional view showing a fastened state of the pipe connector in which the back ferrule of the present invention clamps a pipe.
Figure 3:
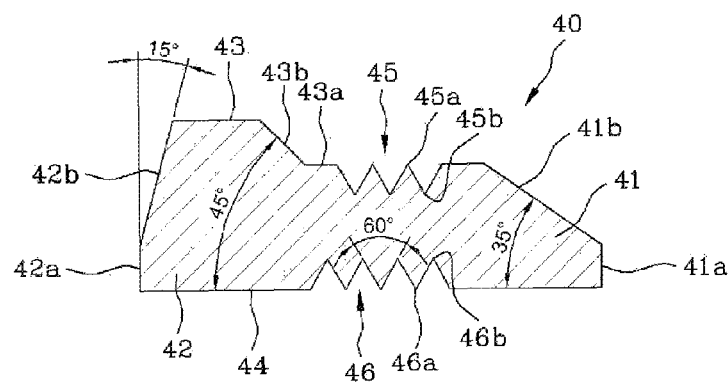
FIG. 3 is a sectional view of the back ferrule according to the present invention.
Figure 4:
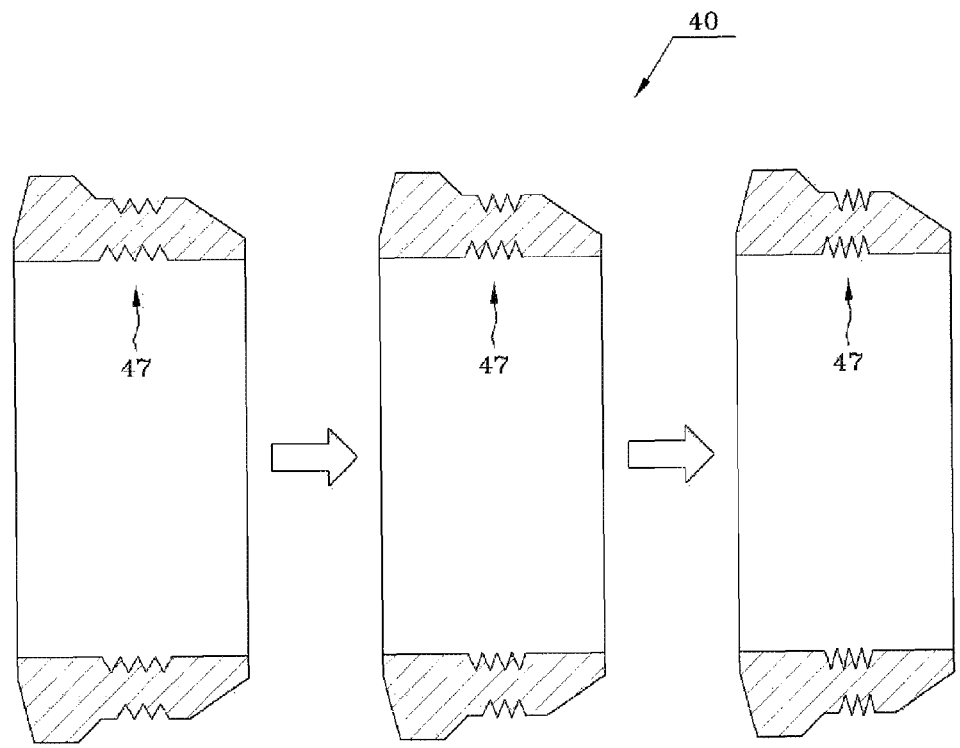
FIG. 4 is a series of sectional views showing step-wise variation in the shape of a bellows-shaped elastic part of the back ferrule according to the present invention.
Figure 5:
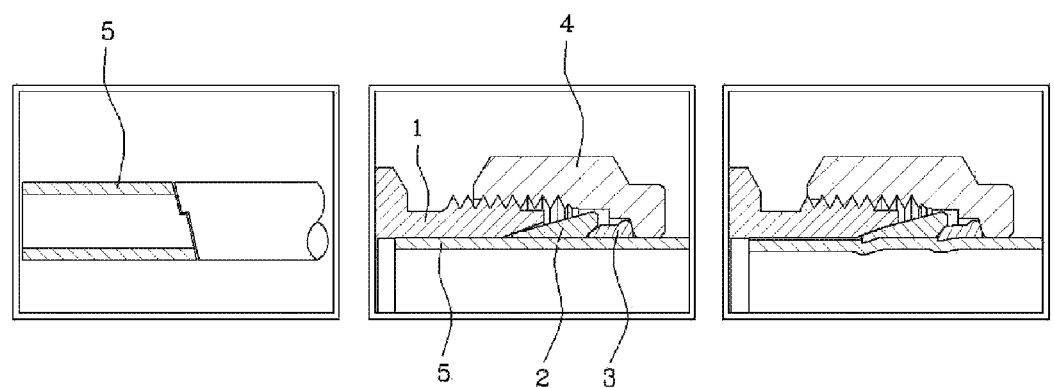
FIG. 5 is a sectional view showing a pipe connector using a conventional ferrule.

Hereinafter, the construction and operation of the present invention will be described in detail with reference to the attached drawings. FIG. 1 is a sectional view illustrating a pipe connector including a back ferrule according to the present invention. FIG. 2 is a sectional view showing a fastened state of the pipe connector in which the back ferrule of the present invention clamps a pipe. FIG. 3 is a sectional view of the back ferrule according to the present invention. FIG. 4 is a series of sectional views showing step-wise variation in the shape of a bellows-shaped elastic part of the back ferrule according to the present invention.

In the following description, unless the context clearly indicates otherwise, the left and right sides are defined based on FIG. 1. As needed, the right side may be designated as the front side, and the left side may be designated as the rear side.

The pipe connector 100 according to the present invention includes: a connector body 10 mounted on an outer circumferential surface of a pipe 1; a drive nut 20 threaded over the connector body 10; and a front ferrule 30 and a back ferrule 40 that is mounted on the outer circumferential surface of a pipe 1 and disposed on inner circumferential surfaces of the connector body 10 and the drive nut 20.

The connector body 10 includes: an external threaded part 11a formed on a portion of an outer circumferential surface of a body part 11; a pipe mounting stopper 14 that is formed in an inner circumferential surface 12 of the body part 11 and has a stepped shape so that a front end of the pipe 1 inserted into the body part 11 is supported by the pipe mounting stopper 14. An inclined receiving part 13 is provided on an end (a rear end) of the body part and has an inclined surface formed such that an inner diameter thereof is reduced from the rear end of the body part toward the inside (the right side of FIG. 1) of the body part. A nose part 32 of the front ferrule 30, which will be explained later herein, is inserted into the inclined receiving part 13 of the body part.

Mounted on the outer circumferential surface of the pipe 1, the drive nut 20 is connected to the connector body 10. An internal threaded part 21a is formed on an inner circumferential surface of a body part 21 of the drive nut 20. The internal threaded part 21a is threaded over the external threaded part 11a of the connector body 10.

The drive nut 20 has, in a rear end thereof, a rear compressing part 22, an inner circumferential surface of which makes contact with the pipe 1. The rear compressing part 22 has an inclined compressing surface 23 that pushes and compresses a rear end of the back ferrule 40, which will be explained later herein.

A multi-stepped part is formed between the compressing surface 23 of the drive nut 20 and the inner circumferential surface of the front portion of the body part 21 of the drive nut 20. Thereby, a space for use in installation of the front ferrule 30 and the back ferrule 40, which will be described later herein, is defined between the outer circumferential surface of the pipe 1 and the inner circumferential surface of the body part 21 of the drive nut 20.

In other words, the front ferrule 30 and the back ferrule 40 are disposed between the inner circumferential surface of the body part 21 of the drive nut 20 and the outer circumferential surface of the pipe 1.

The front ferrule 30 has a cylindrical inner circumferential surface. An outer inclined surface 31, configured such that the outer diameter thereof is reduced from the rear end thereof to the front end, is formed on an outer circumferential surface of the front ferrule 30. A rear inclined surface 33, configured such that the inner diameter thereof is increased from the front end thereof to the rear end, is formed in the rear end of the inner circumferential surface the front ferrule 30. A front end of the back ferrule 40 is inserted along the rear inclined surface 33 into the front ferrule 30 (to the right of FIG. 1).

The back ferrule 40 is mounted on the outer circumferential surface of the pipe 1. The back ferrule 40 includes: a nose part 41 provided on a front end thereof; a tail part 42 provided on a rear end thereof; and a bellows-shaped elastic part 47 formed between the nose part 41 and the tail part 42.

The nose part 41 is provided for use in moving forward along the rear inclined surface 33 of the front ferrule 30 and embedding into the outer circumferential surface of the pipe 1. The nose part 41 includes a front end surface 41a that vertically extends from the front end of the inner circumferential surface 44, and a front-end inclined surface 41b that extends rearward from the front end surface 41a at an incline.

The tail part 42 includes a rear end surface 42a that vertically extends from the rear end of the inner circumferential surface of the back ferrule 40, and a rear-end inclined surface 42b that extends forward from the rear end surface 42a at an incline.

The nose part 41 and the tail part 42 are connected to each other by the outer circumferential surface 43 and the inner circumferential surface 44. As shown in FIG. 3, the outer circumferential surface 43 includes an outer circumferential stepped surface 43a and an outer-circumferential inclined surface 43b so that the outer diameter of the back ferrule 40 is reduced.

An outer circumferential corrugated surface 45 and an inner circumferential corrugated surface 46 are respectively formed on the outer circumferential surface 43 and the inner circumferential surface 44 between the nose part 41 and the tail part 42. Each of the outer and inner circumferential corrugated surfaces 45 and 46 has a plurality of ridges 45a, 46a and a plurality of valleys 45b, 46b. Preferably, the numbers of valleys and ridges of the inner circumferential corrugated surface 46 are larger than those of the outer circumferential corrugated surface 45.

The elastic part 47 that includes the outer and inner circumferential corrugated surfaces 45 and 46 each having a plurality of ridges and valleys has a bellows shape.

A method of coupling the pipe 1 to the pipe connector 100 having the above-mentioned construction will be explained below.

First, the front end (the right end) of the pipe 1 is inserted into the connector body 10 and is brought into contact with and thus supported by the pipe mounting stopper 14. Here, the pipe 1 is inserted into the connector body 10 in such a way that all of the drive nut 20, the front ferrule 30 and the back ferrule 40 are disposed on the outer circumferential surface of the pipe 1.

Thereafter, the drive nut 20 is rotated so that the internal threaded part 21a of the drive nut 20 is threaded over the external threaded part 11a of the connector body 10. When the drive nut 20 is rotated, it is moved forward by the threaded coupling with the connector body 10. The compressing surface 23 of the rear compressing part 22 of the drive nut 20 comes into close contact with the tail part 42 of the back ferrule 40 and pushes the tail part 42 forward. The nose part 32 of the front ferrule 30 is moved forward along the inclined surface of the inclined receiving part 13 of the connector body 10 by the back ferrule 40 that moves forward.

As shown in FIG. 2, the front end of the front ferrule 30 that is forcibly moved forward is partially changed in shape and is embedded into the outer circumferential surface of the pipe 1. Likewise, the front end of the back ferrule 40 is also partially deformed in shape and embedded into the outer circumferential surface of the pipe 1. In detail, the front end of the nose part 41 of the back ferrule 40 that is moved forward along the inclined surface of the rear inclined surface 33 of the front ferrule 30 is embedded into the outer circumferential surface of the pipe 1 and thus changed in shape.

As shown in FIG. 4, the bellows-shaped elastic part 47 formed on the back ferrule 40 is reduced in length with respect to the front and rear direction while the back ferrule 40 is compressed between the front ferrule 30 and the drive nut 20.

That is, when the drive nut 20 rotates on its own axis and moves forward because of the threaded structure, the back ferrule 40 is compressed between the front ferrule 30 and the drive nut 20 and thus changed in shape in such a way that the length of the back ferrule 40 is reduced.

Here, the valleys 45b and 46b and the ridges 45a and 46a of the bellows-shaped elastic part 47 of the back ferrule 40 that includes the outer circumferential corrugated surface 45 and the inner circumferential corrugated surface 46 are reduced in distance therebetween by the compressive force between the front ferrule 30 and the drive nut 20, as shown in the drawing. Thereby, the length of the back ferrule 40 with respect to the front and rear direction is reduced, and the width thereof with respect to the upper and lower direction is increased.

Thanks to the bellows-shaped elastic part 47 having the above-mentioned structure, the sealability of a connection part of the pipe 1 can be enhanced, and the elasticity of the back ferrule 40 can be enhanced so that it can be flexible in responding to a change in the external environment.

Even after the operation of coupling the pipe 1 to the pipe connector using the front ferrule 30 and the back ferrule 40 has been completed, the bellows-shaped elastic part 47 can reliably cope with changes in pressure, temperature or external force applied to the connection part of the pipe because the bellows-shaped elastic part 47 has a bellows shape.

For example, if the temperature of the connection part of the pipe 1 is rapidly increased or reduced, there is a likelihood of the connection part (fitting section) of the pipe or the front ferrule 30 and the back ferrule 40 being undesirably deformed by thermal expansion or contraction.

However, in the present invention using the back ferrule 40 provided with the bellows-shaped elastic part 47, the elements can be prevented from being undesirably deformed or damaged by rapid thermal expansion or contraction. Therefore, leakage of fluid from the connection part attributable to damage of the elements for pipe coupling can be more reliably prevented.

In the embodiment shown in the drawings, although the ridges 45a and 46a and the valleys 45b and 46b of the bellows-shaped elastic part 47 have been illustrated as being triangular, the ridges 45a and 46a and the valleys 45b and 46b of the corrugated part may be rounded to have a curved outline or may have a trapezoidal shape, as needed.

INDUSTRIAL APPLICABILITY

The present invention provides a back ferrule that has enhanced ability in pipe coupling and has high flexibility in responding to a change in the external environment, and provides a pipe connector using the back ferrule. The present invention can be effectively used in pipe connection of a piping system that must have high sealability in a connection part of a pipe and is under conditions of frequent temperature or pressure changes.

The invention claimed is:

1. A back ferrule, the back ferrule (40) being used, for pipe connection, along with: a connector body (10) mounted on an outer circumferential surface of a pipe, with an external thread formed on an outer circumferential surface of the connector body (10); a drive nut (20) having an internal thread on an inner circumferential surface thereof; and a front ferrule (30), the back ferrule (40) comprising:
a nose part (41) having a front-end inclined surface (41b);
a tail part (42) having a rear-end inclined surface (42b);
an outer circumferential surface (43) and an inner circumferential surface (44) connecting the nose part to the tail part; and
a bellows-shaped elastic part comprising an outer circumferential corrugated surface (45) and an inner circumferential corrugated surface (46) respectively formed on the outer circumferential surface and the inner circumferential surface between the nose part and the tail part,
wherein each of the outer circumferential corrugated surface and the inner circumferential corrugated surface comprises a plurality of valleys and a plurality of ridges, and numbers of valleys and ridges of the inner circumferential corrugated surface are larger than numbers of valleys and ridges of the outer circumferential corrugated surface.

* * * * *